United States Patent [19]

Gartner et al.

[11] Patent Number: 4,607,919
[45] Date of Patent: Aug. 26, 1986

[54] MANIPULATOR FOR USE WITH A SURGICAL MICROSCOPE

[75] Inventors: Hartmut Gartner, Oberkochen; Klaus Biber, Aalen; Peter Greve, Essingen, all of Fed. Rep. of Germany

[73] Assignee: Carl-Zeiss-Stiftung, Heidenheim/Brenz, Oberkochen, Fed. Rep. of Germany

[21] Appl. No.: 654,861

[22] Filed: Sep. 26, 1984

[30] Foreign Application Priority Data

Oct. 7, 1983 [DE] Fed. Rep. of Germany ....... 3336519

[51] Int. Cl.⁴ .............................................. G02B 21/00
[52] U.S. Cl. ............................... 350/507; 74/471 XY; 74/522
[58] Field of Search ....................... 350/636, 635, 486; 248/481, 482, 483, 484, 487; 74/522, 471 XY

[56] References Cited

U.S. PATENT DOCUMENTS 4,526,447  7/1985  Taylor .................................. 350/636

FOREIGN PATENT DOCUMENTS 0013234  2/1981  Japan .................................. 350/635

Primary Examiner—John K. Corbin
Assistant Examiner—Vincent J. Lemmo
Attorney, Agent, or Firm—Hopgood, Calimafde, Kalil, Blaustein & Judlowe

[57] ABSTRACT

A manipulator is provided for a surgical microscope in order to deflect a laser beam on the viewed operating area, the movement of a handle being transmitted via a lever mechanism to the movement of a mirror which reflects the laser beam to a point and via a path within the viewed operating area. The sensitivity of transmitted motion can be adapted to the selected magnification of the surgical microscope by changing the length of a transmission lever in order to change its point of motion pick-off from the handle.

11 Claims, 6 Drawing Figures

4,607,919

MANIPULATOR FOR USE WITH A SURGICAL MICROSCOPE

BACKGROUND OF THE INVENTION

The invention relates to a manipulator for deflecting a beam of laser radiation onto a microscope-observed field of surgical operation, the laser beam being deflected via a plane mirror which is rotatable about two different axes.

From Federal Republic of Germany OS 2,710,995, a laser-optical instrument is known for operations beneath a microscope in which a plane mirror aligns the laser beam and an optical axis of the microscope, and in which the position of the plane mirror is controlled by a servomechanism.

BRIEF STATEMENT OF THE INVENTION

The object of the invention is to provide a mirror-actuating mechanism for controlled deflection of a laser beam within an operating area, which mechanism can be operated sensitively by hand and the sensitivity of which is adjustable.

The invention achieves this object in conjunction with an actuating lever which is manually manipulable with two degrees of angular freedom about a fixed center of manipulation. The lower end of this lever is characterized by a cylindrical guide bore on a bore axis through the fixed center of rotation. A second lever is fulcrumed on an axis transverse to the rotary axis of an axially fixed member, and one end of the second lever has a motion pick-off connection to the handle lever, via the guide bore. The other end of the axially fixed member provides pivotal support of the mirror about a pivot axis transverse to the rotary axis of the axially fixed member, the pivot axis being parallel to the fulcrum axis of the second lever. And a link connection from the other end of the second lever to a point on the mirror (at offset from the mirror-pivot axis) completes a four-bar linkage; for one component of angular manipulation of the handle, the four-bar linkage is bodily rotatable to rotate the mirror about the rotary axis (of the axially fixed member), and for an orthogonally related component of angular manipulation of the handle, the four-bar linkage is angularly compressed or expanded, to change the tilt of the mirror about its pivot axis.

In order to adjust the transmission ratio of handle movement to mirror movement, the effective length of the second lever arm is advisedly variable, to enable adjustment of its point of motion pick-off from the first lever.

In one advantageous embodiment of the invention, the motion pick-off end of the second lever is characterized by a spherical enlargement guided in the guide bore of the handle lever, and the second lever arm can be adjusted by shifting the position of its spherical pick-off end within the cylindrical guide bore.

The advantages obtained with the invention reside, in particular, in the fact that the focused spot of the laser beam is deflected within the viewed operating area in the same direction as the handle is manipulated and that, as a result of the favorable transmission ratio of the lever motion pick-off relation, large angular displacements of the handle correspond to small laser-spot displacements on the operating area. Another great advantage of the manipulator resides in the possibility of changing the transmission ratio by changing the length of the second lever arm to change the point of motion pick-off; as a result, manipulated deflection of the laser beam on the operating area can be adapted to different magnification ratios in the surgical microscope.

DETAILED DESCRIPTION

Figure 1A:
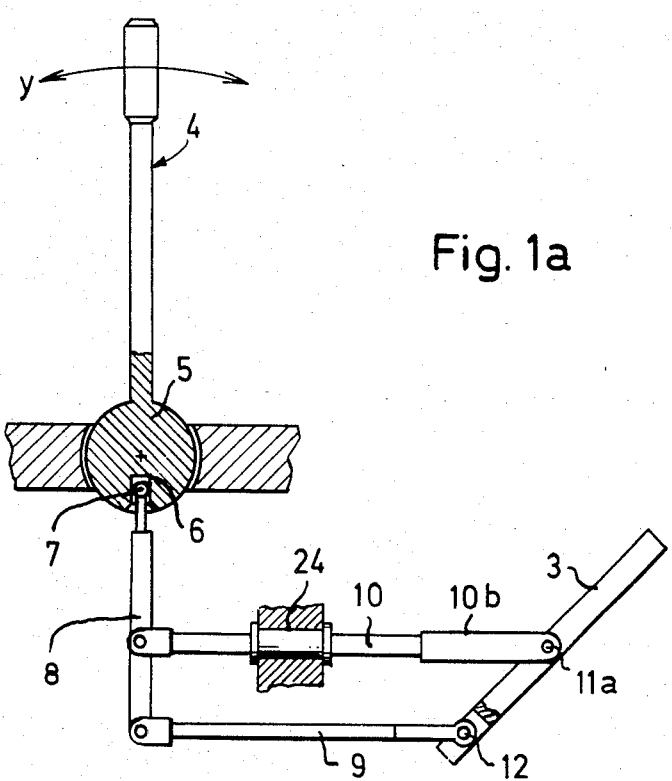
Figure 1B:
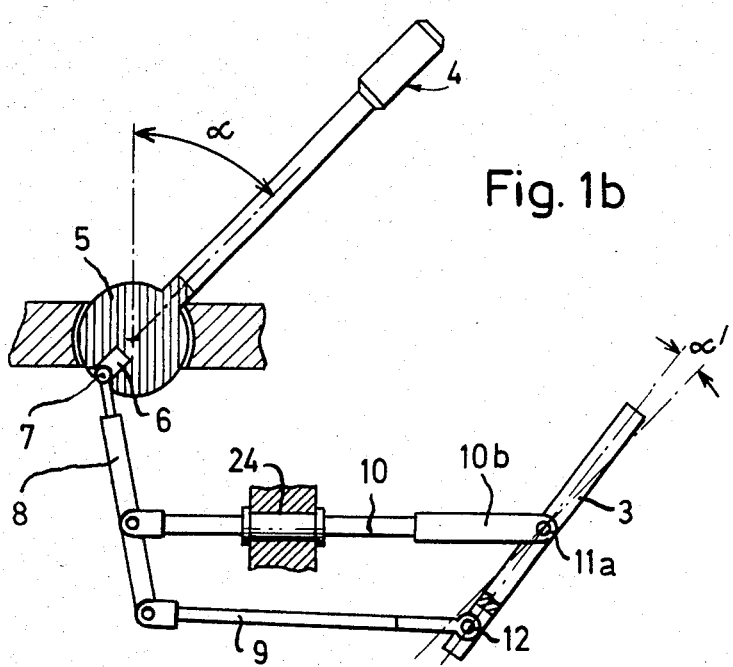
Figure 1C:
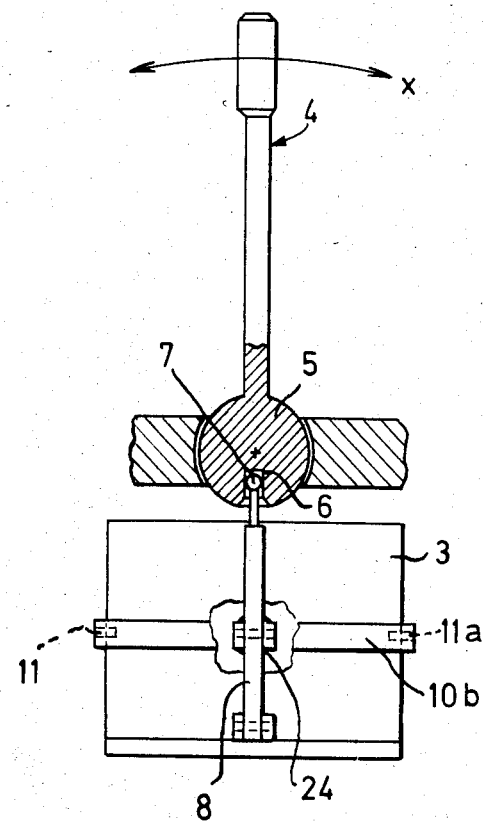
Figure 1D:
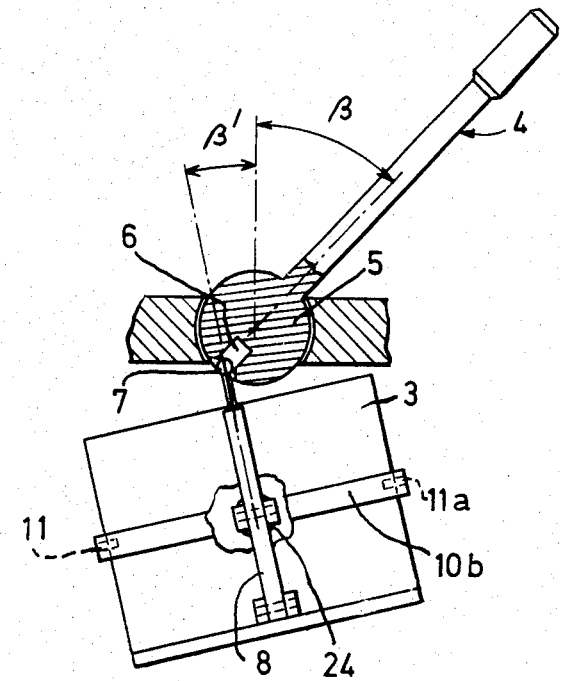
Figure 2:
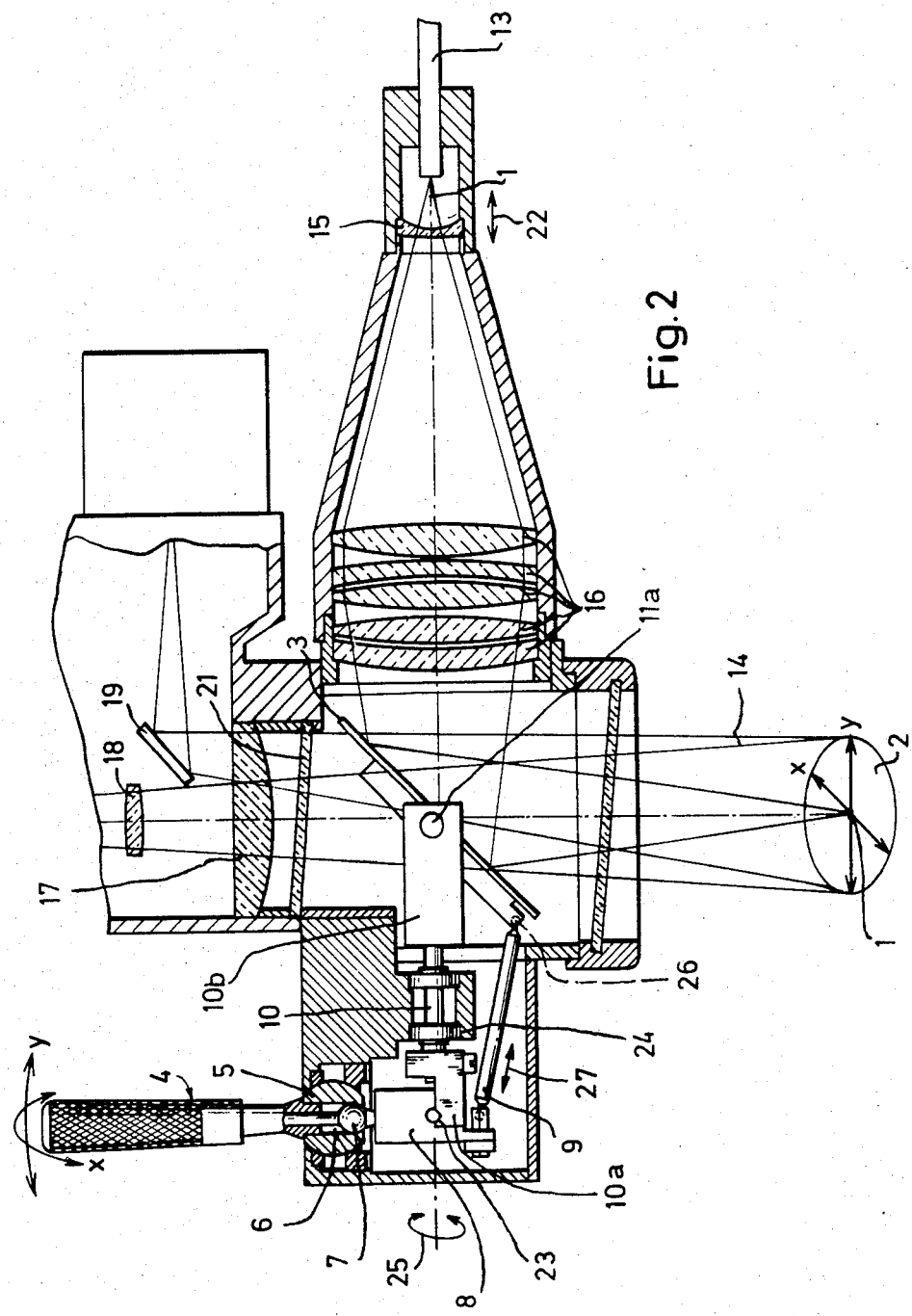
Figure 3:
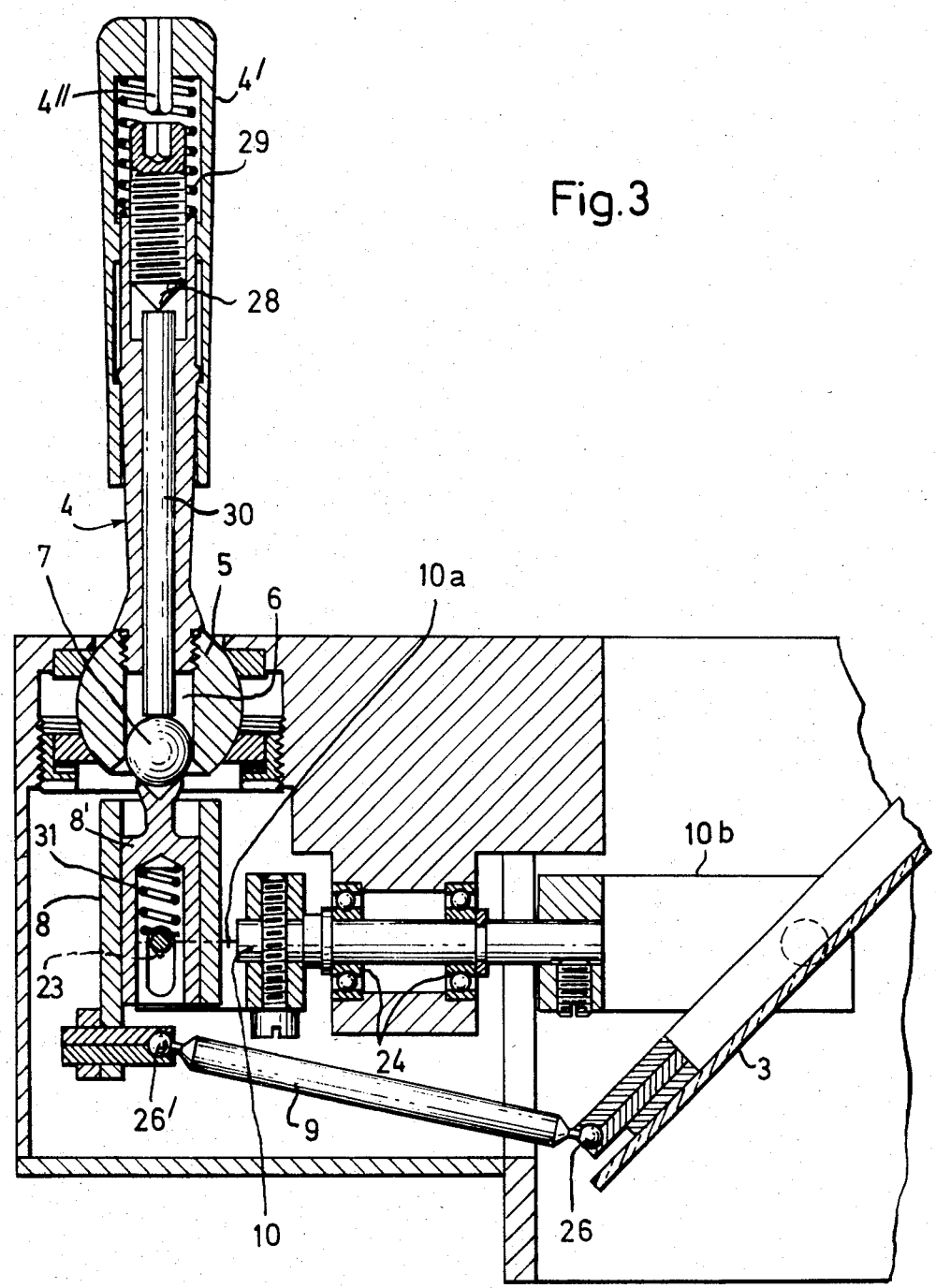

The invention will be illustratively described in conjunction with the accompanying drawings, in which:

FIGS. 1a to 1d are similar basic diagrams to illustrate mirror-actuating lever mechanism of the invention, FIG. 1a showing the mechanism for a centered position of angular deflection in response to a first direction y of manual actuation about a first component axis, FIG. 1b showing the mechanism for an off-center displacement about the first axis, FIG. 1c showing the mechanism for a centered position of second-axis deflectability and FIG. 1d showing the mechanism for an off-center displacement about the second axis;

FIG. 2 is a view in partial section through a surgical microscope with an integrated manipulator for laser radiation; and FIG. 3 is an enlarged fragmentary section through lever mechanism of FIG. 2.

In the diagrams of FIGS. 1a to 1d, 4 identifies an actuating handle or lever arm for moving a mirror 3 to deflect a laser beam. The handle 4 is provided with an enlarged spherical bearing formation 5 at its lower end. Within this spherical formation 5 is a cylindrical guide 6 within which the enlarged spherical end formation 7 of a second lever arm 8 is movable. An arm member 10 is axially retained at a bearing 24 and at one end is pinned to lever arm 8, thus providing a fulcrum for arm 8 action in response to y-directed actuation of handle 4; the other end of arm member 10 is forked at 10b where it is pinned (at 11-11a) to opposite sides of mirror 3, thus providing a fulcrum for mirror 3 displaceability; the fulcrums at the respective ends of member 10 are on parallel axes. A link arm 9 connects the lower end of lever arm 8 to the lower end (12) of the mirror. In the handle-centered position of FIG. 1a, mirror 3 is shown in a 45-degree beam-reflecting position, and upon displacement of handle 4 in the y direction, as though a relatively large angle α, mirror 3 is correspondingly moved through a relatively small angle α'.

Arm 10 is rotatable in bearing 24 to permit mirror (3) displacement in response to handle (4) actuation in the second-component or x direction. For this second component, FIGS. 1c and 1d illustrate that a relatively large angle β of handle (4) actuation causes a relatively small angle β' of mirror (3) rotation about the axis of bearing 24.

Link arm 9 will be seen to complete a four-bar linkage which also involves mirror 3, lever 8 and arm member 10; for x-component manipulation of handle 4, the four-bar linkage (including mirror 3) bodily rotates about the axis of arm member 10, and for y-component manipulation, the four-bar linkage is compressed or expanded to change the tilt of the mirror.

In FIGS. 2 and 3, parts which perform the same function as in the basic diagrams 1a to 1d have been provided with the same reference numbers.

In FIG. 2, an optical fiber 13 is shown delivering laser-beam radiation 1 to a beam-expanding optical system 15, which in turn serves an optical system 16 for focus of laser radiation (via mirror 3) at a point within a surgical operating area 2 which appears in the field of view of an operation microscope. The axis of entering laser radiation is normal to the observation axis of objective 17 and is substantially aligned with the rotary axis of member 10. The microscope is shown to include an objective 17 and an observation optical system 18 whereby its observation-ray path 14 may serve the field of view 2. Mirror 3 is preferably a splitter mirror, deflecting about 99 percent of incident laser radiation onto the operating area, and for protection of the observer, a laser-protection filter 21 is positioned in the observation-ray path 14.

The microscope is also shown to include a field-illuminating system wherein a mirror 19 folds projected light for passage through the main objective 17. This illuminating system can incorporate customary provision for adjustability, as to size and brightness of the illuminated field. And to change the size of the focal spot of laser radiation at the operating area 2, the beam-expanding optical system 15 may be axially adjustable, as suggested by a double-headed arrow 22. Since the wavelength of therapy laser radiation may be invisible, it is advisable to superpose a target-light laser radiation onto the therapy radiation; this superpositioning is not part of the invention and is therefore not shown but it will be understood to have been incorporated in the radiation delivered by optical fiber 13, so that both the therapy and the target-light laser radiations are expanded by optical system 15.

Upon movement of handle 4, for example in the direction x, the focal spot of laser radiation also travels in the correct coordinate sense and in the same direction. Upon movement of handle 4 in the direction y, the focal spot of laser radiation also travels over the operating area in the correct coordinate sense and in the direction y.

As shown, the lever 8 comprises outer and inner telescoping parts 8-8', and the connection of arm 10 to lever 8 is via a V bearing in an L-shaped forked connecting end part 10a of arm 10; the connection is to the outer lever part 8 via a transverse pin 23 (parallel to the mirror-pivot axis 10-10a), and pin 23 is loaded by spring means 31 to seat in the V bearing. Thus, upon actuating movement of handle 4 in the x-direction, arm 10 and mirror 3 are rotated in the direction indicated by double arrow 25. The link arm 9 is connected by ball-and-socket means 26 to mirror 3 and 26' to lever 8, so that upon actuating movement of handle 4 in the y-direction, link 9 moves in the direction indicated by double arrow 27, in transmitting its motion to mirror 3. It is seen that arms 9-10 can carry out their respective motions simultaneously, thus enabling laser focus at any desired spot within the field of view.

FIG. 3 illustrates a particularly advantageous embodiment for developing the lever mechanism, whereby the proportion of mirror displacement is adjustable, in relation to actuating displacement of handle 4. In FIG. 3, the point of handle-motion pick-off (by spherical formation 7) is adjustable within the cylindrical guide bore 6 of handle 4. The internal telescoping part 8' retains spring 31 and carries the spherical formation 7, so that spring 31 necessarily urges formation 7 upwardly in guide bore 6. A given adjusted position of formation 7 in guide bore 6 is determined by an adjustable stop screw 28 and pin 30; stop screw is an internally threaded part of handle 4 and is available for adjustment when a rotatable grip 4' of handle 4 is engaged to screw 28, as by a temporary insertion of a locking key 4" of square section (key 4" being part of grip 4') in the conforming end recess of screw 28; as shown, a compression spring 29 relieves such keyed engagement, but it is only necessary to press the grip 4' downwardly onto handle 4 to effect the engagement and then to rotate screw 28 to change the radial offset of the center of formation 7 with respect to the center of universal action of formation 5. Preferably, guide 6 is sufficiently elongate to range the point of motion pick-off by spherical formation 7, from a point substantially coincident with the fixed center of handle 4 manipulability, to an outer adjusted point that is substantially 25 percent of the radial offset distance between the axis of arm 10 and the fixed center of handle 4 manipulability.

What is claimed is:

1. An optical beam manipulator for selectively deflecting a light beam over an operating area, said manipulator comprising a mirror, mounting means for said mirror comprising an axially retained member that is rotatable about a first rotary axis, said mirror having pivotal connection to one end of said axially retained member on a first pivot axis transverse to said first rotary axis; an actuating lever including a spherical formation mounted universally for two degrees of angular freedom for said lever about a fixed center of manipulation, said fixed center being at offset from said first rotary axis and said spherical formation having a cylindrical guide bore on an axis through said fixed center, a motion pick-off lever of variable length fulcrum-connected to the other end of said axially retained member on a second pivot axis that is parallel to said first pivot axis, a link member connecting a part of said pick-off lever to a part of said mirror and completing a four-bar linkage which includes said mirror, said axially retained member, and said motion pick-off lever; and a motion pick-off connection for said motion pick-off lever and including a spherical formation guided in said bore.

2. A manipulator according to claim 1, in which the length of said motion pick-off lever is adjustable to shift the position of its spherical formation in said cylindrical guide bore.

3. A manipulator according to claim 2, characterized by the fact that for any adjusted position of said motion pick-off lever formation an adjusted radius of pick-off lever connection to said handle is retained with respect to the fixed center of handle manipulation.

4. In combination, a microscope having an objective on an observation axis for viewing a limited field of view, a laser-output connection to said microscope and means including a selectively manipulable mirror so mounted to said microscope as to fold laser output to a spot in said field which spot is small compared to said field; mounting means for said mirror comprising an axially retained member that is rotatable about a first axis, said mirror having pivotal connection to one end of said axially retained member on a first pivot axis transverse to said first axis; an actuating lever mounted universally for two degrees of angular freedom about a fixed center of manipulation, said fixed center being at radial offset from said first axis, a motion pick-off lever fulcrum-connected to the other end of said axially retained member on a second pivot axis that is parallel to said first pivot axis, a link member connecting a part of said pick-off lever to a part of said mirror and completing a four-bar linkage which includes said mirror, said axially retained member, and said motion pick-off lever; and a motion pick-off connection having two degrees of angular freedom between said handle and said motion pick-off lever, said motion pick-off lever comprising telescoping inner and outer component parts the outer one of which is fulcrum-connected to said axially retained member, and the inner one of which is connected to said actuating lever, the point of such motion pick-off connection being at shorter offset from the fixed center of handle manipulability than the offset of said point from said first rotary axis, whereby laser-spot deflection within the field of view sensitively and on a reduced scale tracks the direction and extent of handle manipulation.

5. In combination, a microscope having an objective on an observation axis for viewing a limited field of view, a laser-output connection to said microscope on a laser-beam entry axis normal to said observation axis, and a selectively manipulable mirror so mounted to said microscope as to fold laser output to a spot in said field which spot is small compared to said field; mounting means for said mirror comprising an axially retained member that is rotatable about a first rotary axis that intersects the observation axis and is substantially aligned with the laser-beam entry axis, said mirror having pivotal connection to one end of said axially retained member on a first pivot axis normal to said first axis and substantially at the intersection of said first axis with the observation axis; an actuating lever mounted universally for two degrees of angular freedom about a fixed center of manipulation, said fixed center being at radial offset from said first rotary axis and located in the geometrical plane defined by said first rotary axis and by the observation axis, a motion pick-off lever fulcrum-connected to the other end of said axially retained member on a second pivot axis that is parallel to said first pivot axis, a link member connecting a part of said pick-off lever to a part of said mirror and completing a four-bar linkage which includes said mirror, said axially retained member, and said motion pick-off lever; and a motion pick-off connection having two degrees of angular freedom between said handle and said motion pick-off lever, said motion pick-off lever comprising telescoping inner and outer component parts the outer one of which is fulcrum-connected to said axially retained member, and the inner one of which is connected to said actuating lever, and the point of such motion pick-off connection being at shorter offset from the fixed center of handle manipulability than the offset of said point from said first rotary axis, whereby laser-spot deflection within the field of view sensitively and on a reduced scale tracks the direction and extent of handle manipulation.

6. The combination of claim 5, in which said second pivot axis substantially intersects said first rotary axis.

7. The combination of claim 5, in which the points of link connection are in a geometrical plane which includes said first rotary axis.

8. The combination of claim 5, in which said motion pick-off connection comprises a cylindrical bore in said actuating lever, said bore being on an axis through the fixed center of manipulation, the inner telescoping component part having a spherical end formation locating in said bore, and selectively operable adjustable means for radially positioning said spherical end formation with respect to the fixed center of manipulation.

9. The combination of claim 8, in which said adjustable means includes a stop member carried by said actuating lever and adjustably determining the limit of radial entry of said inner component part in said bore, and means on said pick-off lever compressionally loading said spherical end formation into stop-member contact.

10. The combination of claim 9, in which the range of stop member adjustable positioning is such as to enable selective placement of the center of said spherical end formation either substantially on the fixed center of manipulation or at adjusted radial offsets therefrom, the maximum adjusted radial offset being substantially 25 percent of the radial offset of said fixed center from said first rotary axis.

11. The combination of claim 10, in which said mirror is inclined at 45 degrees to the observation axis and to thelaser-beam entry axis when said spherical end formation is positioned concentric to said fixed center of manipulation.

* * * * *